D. Wills.
Gill-Net.
Nº 76284. Patented Mar. 31, 1868.
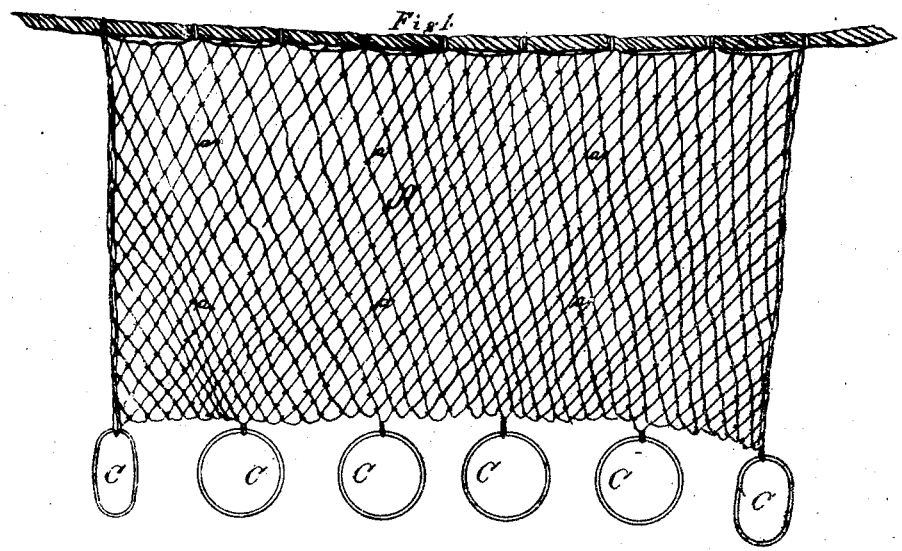
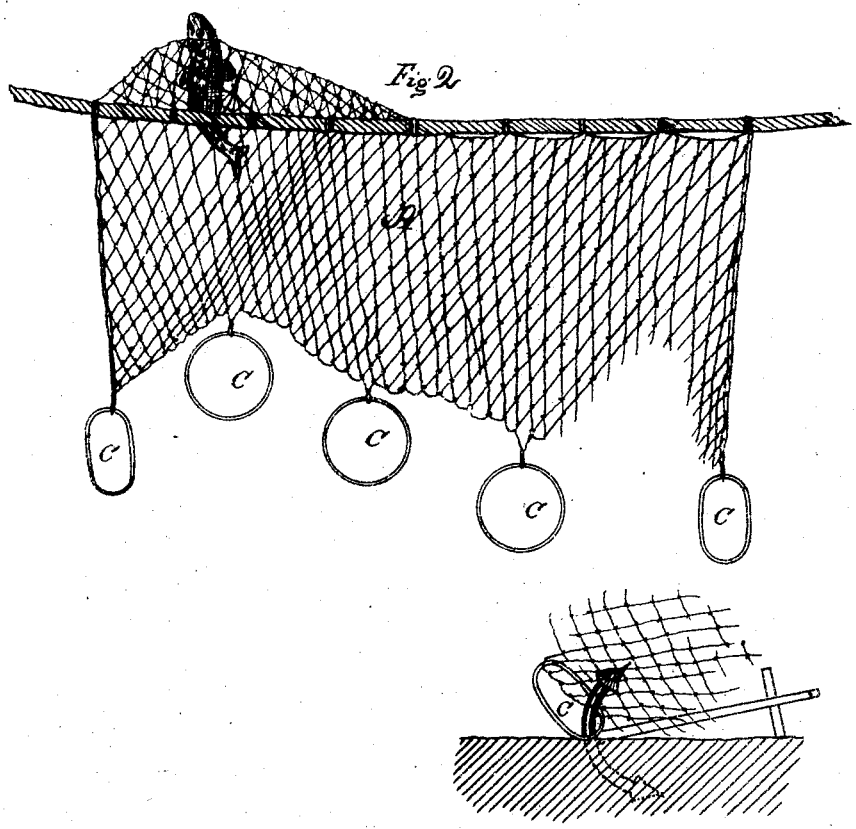
Witnesses:
Inventor:
Daniel Wills
By Wiedersheim & Co.
Attorneys

United States Patent Office.

DANIEL WILLS, OF CAMDEN, NEW JERSEY.

Letters Patent No. 76,284, dated March 31, 1868.

IMPROVEMENT IN GILL-NETS.

The Schedule referred to in these Letters Patent and making part of the same.

TO ALL WHOM IT MAY CONCERN:

Be it known that I, DANIEL WILLS, of Camden, in the county of Camden, and State of New Jersey, have invented a new and useful Improvement in Gill-Nets; and I do hereby declare the following to be a clear and exact description of the nature thereof, sufficient to enable others skilled in the art to which my invention appertains to fully understand and use the same, reference being had to the accompanying drawings, making part of this specification, in which—

Figure 1 is an elevation of the device illustrating my invention.

Figure 2 represents the working thereof.

Similar letters of reference indicate corresponding parts in the two figures.

My invention relates to an improvement in gill-nets, by which the fish is readily caught after it enters the meshes, saves the net from great tearing and damage by fouling, and prevents entanglement and unnecessary rolling up.

In the ordinary gill-nets now in use, it is customary to run a lead-line along the bottom of net, said line consisting of an ordinary cord or rope, with a series of weights or sinkers, sufficiently heavy to hold the net in an extended vertical position when floating.

It is well known to fishermen that the use of the lead-line is attended with great loss in net, fish, and time. When the fish swims along and partly enters one of the meshes, or the net meets it, its first effort is to disengage itself by a quick forward and upward stroke. Since the net is held taut by the weight of the lead-line, the fish is often successful in its efforts. An old net will break, and the fish is free. When the meshes are about the size of the gills, the fish easily frees itself; the meshes yield but slightly, and thus give the fish an opportunity to work itself loose.

Again, if the net fouls on either snags, anchors, rocks, sunken boats, or other obstruction, the meshes will break away and tear at the point where they catch, after which the lead-line will take hold of the obstruction, and the strain will be on a great portion around the already torn away part, which portion likewise gives way and often carries nearly the whole net with it. Or, if the net becomes entangled from any cause, the weights or sinkers pass in and out through the meshes in such a way as to increase the entanglement, to the great annoyance and loss of time of those interested.

When the nets float in shallow water over shoals or bars, the ordinary lead-line drags on the bottom, and rolls itself up with the net, so as to consume considerable time, often several days, to unroll it, which is a great loss, since fishermen depend on the season, and must utilize every moment thereof.

My invention is intended to remedy the above evils, as will be hereinafter more fully described.

In the drawings, A represents a gill-net, whose meshes, a, are of ordinary form and construction. The net is buoyed in the water by the cord or line B, having the usual corks or floats, and securely united to the upper row of meshes. From the lower row of meshes I suspend a series of rings or open frames, C. These frames C are formed by preference of light metal, and of size a little larger than the meshes of the net, and are attached directly to the meshes at proper distance from each other. The weight of the rings or frames should be such to hold the net sufficiently extended for fishing purposes, and is intended to take the place of the lead-line hitherto in use.

I dispense with the continuous rope or line at the lower end of the net, and weave each ring in one of the meshes, or attach it to the mesh by a small cord or thread. When the fish strikes the net, or runs into it, it endeavors to free itself, and rushes forward and upward. The light rings or frames allow the portion of the net surrounding the fish "to give" or go with it. The meshes then contract and surround it, and fairly hold it. Its efforts to release itself only entangle it the more, and hold it in the meshes. Were the net held taut by the lead-line, the fish would have somewhat of an opportunity to escape, because the meshes scarcely give or yield. After the fish ceases its struggles, the net assumes its regular position and floats extended as before. When the net floats with the stream, and any portion of it strikes afast or obstructions on the bottom, it will give or yield, and tear itself loose at or about the portion only which is caught, and then fish along as before. The other portion of the net will still remain intact and not be destroyed, as is often the case when the lead-line is employed, because it would exert a strain on almost the entire length of the net.

When the net is drawn out of the water on the platform or boat, the rings or frames will not pass through the meshes as the ordinary lead-weights do, and entangle the whole net when it is carelessly handled, but they lie between the folds, and do not enter the meshes, and so soon as the net is opened they readily disengage themselves and allow the unfolding of the net without any tangling whatever.

If the net passes over bars, or where the water is shallow enough for the net to touch bottom, it will float over it without fouling or rolling up, as is the case in the ordinary lead-line. The latter commences to roll up only a little at first, and then continues rolling, carrying the net with it. Then the weights pass in and out of the meshes, and the whole net is twisted or tangled in a manner to occupy considerable time to disentangle.

Open rings or frames are necessary, because they are not affected by the current of the river or stream. It passes through them, but will act against a solid or flat plate, and cause the bottom of the net to be carried or floated upwards. They should be made of material sufficiently heavy to hold the net down, still light enough to allow it to give or yield at the time and places as stated, and may be of any form, either circular, triangular, square, or otherwise.

When a great part of the net is twisted or torn by any of the causes hitherto stated, the time involved in untwisting or disentangling, and the new thread required for repairs, are serious objections to fishing, and are drawbacks to the successful result or prosecution of the business. Many nets of the old construction have been entirely destroyed, or have disappeared, owing to the resistance and disadvantages of the lead-line.

A fisherman must economize his time, as well as his means, and by my improvement I supply a need long felt, and as such it is pronounced by that class of men as practical, simple, and extremely useful.

Having thus described my invention, what I claim as new, and desire to secure by Letters Patent, is—

The application of a series of open frames or rings to the meshes of the bottom of the net, substantially as described, for the purpose specified.

To the above I have signed my name, this seventeenth day of February, 1868.

DANIEL WILLS.

Witnesses:
   WM. A. WIEDERSHEIM,
   WILLIAM WALTON.